Oct. 1, 1968 R. Y. GILL 3,404,050

METHOD AND APPARATUS FOR PRODUCING INSULATED ELECTRICAL CONDUCTORS

Filed Nov. 16, 1964

Inventor
RONALD Y. GILL
By Percy P. Lantzy
Attorney

United States Patent Office 3,404,050

Patented Oct. 1, 1968

3,404,050
METHOD AND APPARATUS FOR PRODUCING INSULATED ELECTRICAL CONDUCTORS

Ronald Yaxley Gill, London, England, assignor to International Standard Electric Corporation, New York, N.Y., a corporation of Delaware Filed Nov. 16, 1964, Ser. No. 411,276
Claims priority, application Great Britain, Dec. 3, 1963, 47,658/63
4 Claims. (Cl. 156—53)

ABSTRACT OF THE DISCLOSURE

Interleaved insulating tapes are wound on a common rotatable supply reel which is mounted concentrically about a conductor. The tapes are then wound onto the conductor simultaneously from different peripheral portions of the reel in overlapping helical paths.

This invention relates to insulated electric conductors.

According to the present invention there is provided a method of insulating an electrical conductor which includes the step of winding a plurality of tapes of an electrical insulating material in successive helical paths with one edge of each tape overlapped by the tape in the next successive helical path.

Figure 1:
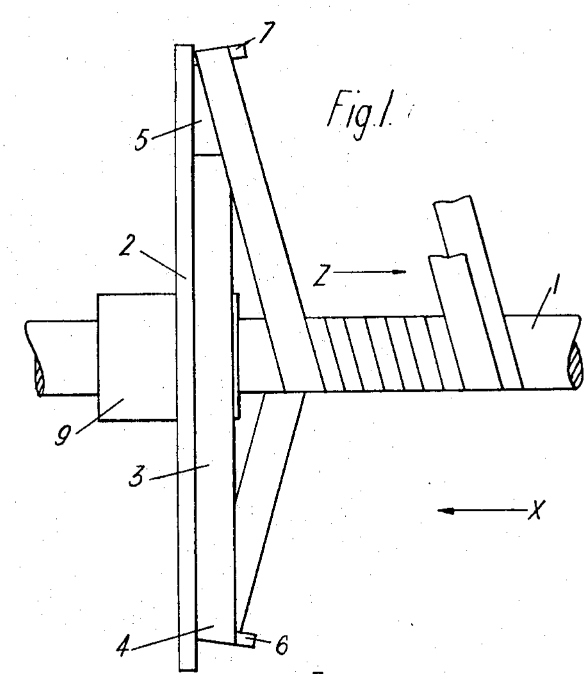
Figure 2:
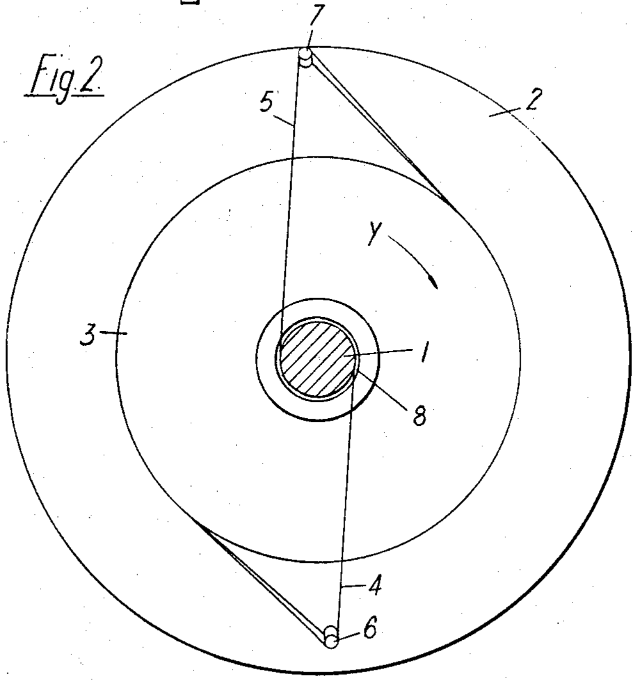

In the accompanying drawings which illustrate an embodiment of the present invention:

FIG. 1 is a side view of a paper tape winding machine insulating an electrical conductor, and FIG. 2 is an end view of FIG. 1, in the direction of arrow X.

Referring to FIGS. 1 and 2 there is shown a conductor 1 passing through a bore 8 in a tape head 2. The tape head 2 carries a tape supply reel 3 which surrounds the conductor 1. The tape supply reel 3 is composed of two interleaved paper tapes 4 and 5 which pass over guide pins 6 and 7 respectively. The tape head 2 is supported by a flange 9 which is arranged to be rotatably driven in the direction of arrow Y (FIG. 2). The tape supply reel 3 is secured on the tape head 2 by a friction brake to permit relative rotation therebetween.

In operation the ends of the paper tapes 4 and 5 are unwound from the supply reel 3 passed over the guide pins 6 and 7 and lapped by hand round the conductor 1 as shown in FIG. 1. To prevent the turns lapped by hand from unwinding they are secured about the conductor 1 by an adhesive tape. The conductor 1 is then drawn in the direction of arrow Z (FIG. 1) and the tape head 2 is driven in the direction of arrow Y (FIG. 2) so that the tapes 4 and 5 are gradually unwound from the reel 5 and lapped on to the conductor 1 with each tape overlapping one half of the width of the other one. When the whole length of the conductor 1 is covered with the tapes 4 and 5 the cable 1 and tape head 2 are stopped and the last few turns of tapes 4 and 5 are secured about the conductor 1 before they are separated from the reel 3 by tearing them.

If desired more than two tapes 4 and 5 may be supplied from the reel 3 over a number of guide pins 6 and 7. Alternatively the tapes 4 and 5 may be supplied from two reels 3 mounted side by side on the tape head 2.

In another alternative arrangement the reel 3 may be mounted to one side of the tape head 2 so that its axis of rotation follows a circular path round the conductor 1 as the tapes 4 and 5 are lapped onto the cable 1.

The insulating tape may be of other materials than paper, for example, the tape may be of a fabric, fibre glass, polythene, polyvinyl chloride or polystyrene.

I claim:

1. A method of insulating an electrical conductor which includes the steps of mounting a rotatable supply reel concentrically about the conductor, said reel having a plurality of interleaved electrical insulating tapes wound thereon, winding said plurality of tapes from different respective peripheral portions of said reel simultaneously onto said conductor in successive helical paths with one edge of each tape overlapped by the tape in the next successive helical path.

2. A method as claimed in claim 1 in which one half of the width of each tape is overlapped by the tape in the next successive helical path.

3. Apparatus for winding insulating tape onto an electrical conductor comprising a supply reel having a plurality of interleaved electrical insulating tapes wound thereon, a tape head carrying said reel, said tape head being rotatably and concentrically mounted with respect to the conductor, means for driving said tape head and reel, and guide means mounted on said tape head for guiding each of said tapes respectively from different peripheral portions of said reel simultaneously around said conductor in successive helical paths with one edge of each tape overlapped by the tape in the next successive helical path.

4. The apparatus of claim 3 wherein said reel is mounted concentrically on said tape head about said conductor.

References Cited

UNITED STATES PATENTS

| | | | |
|---|---|---|---|
| 3,194,871 | 7/1965 | Garner et al. | 156—53 X |
| 3,332,814 | 7/1967 | Yoshimura et al. | 156—56 X |

FOREIGN PATENTS

| | | |
|---|---|---|
| 716,922 | 10/1954 | Great Britain. |
| 1,009,306 | 3/1952 | France. |

EARL M. BERGERT, *Primary Examiner.*

T. R. SAVOIE, *Assistant Examiner.*